United States Patent [19]
Xiao

[11] Patent Number: 5,799,042
[45] Date of Patent: Aug. 25, 1998

[54] WIRELESS DIGITAL COMMUNICATION SYSTEM, A RADIO APPARATUS, A DIGITAL SPEAKER, AND A DIGITAL SPEAKER CONTROLLING APPARATUS

[75] Inventor: Qun Xiao, Kessel-Io, Belgium

[73] Assignee: U.S. Philips Corporation, New York, N.Y.

[21] Appl. No.: 543,669

[22] Filed: Oct. 16, 1995

[30] Foreign Application Priority Data

Oct. 17, 1994 [EP] European Pat. Off. ............. 94203015

[51] Int. Cl.$^6$ .............................. H04B 7/08; H04L 1/06
[52] U.S. Cl. .................. 375/285; 375/347; 371/37.5; 455/277.2
[58] Field of Search ........................ 375/267, 285, 375/346, 347; 455/33.3, 65, 272, 277.1, 278.1, 280, 283, 293, 277.2; 370/334; 371/5.1, 30, 37.5

[56] References Cited

U.S. PATENT DOCUMENTS 5,239,541 8/1993 Murai ........................... 375/347 X
5,561,673 10/1996 Takai et al. ....................... 371/5.5

FOREIGN PATENT DOCUMENTS 0454585 10/1991 European Pat. Off. .

OTHER PUBLICATIONS

"Principles of Optical Disc Systems", G. Bouwhuis et al, Adam Hilger Ltd, 1985, pp. 228–255.

Primary Examiner—Don N. Vo
Assistant Examiner—Amanda T. Le

[57] ABSTRACT

Wireless digital communication systems apply an antenna diversity scheme to combat fading in a received signal as received by a receiver in the system. A radio apparatus having a single receiver front-end comprises a simple and robust antenna diversity scheme. In the system, digital radio signals are transmitted to the radio apparatus, wherein the transmitted radio signals comprise redundant information for allowing error correction at reception side. The error correction capability at reception side is applied for antenna diversity switching. Within the error correction capability of an error correction decoder comprised in the radio apparatus, the radio apparatus searches for a better antenna or antenna combination. When a better antenna or antenna combination is found, the receiver front-end is coupled to the better antenna or antenna combination.

17 Claims, 4 Drawing Sheets

WIRELESS DIGITAL COMMUNICATION SYSTEM, A RADIO APPARATUS, A DIGITAL SPEAKER, AND A DIGITAL SPEAKER CONTROLLING APPARATUS

BACKGROUND OF THE INVENTION

1. Field of the Invention

The present invention relates to a wireless digital communication system comprising a radio apparatus having at least two antennas and a single receiver front-end which is coupled to the antennas via an antenna selection switching arrangement, and having a diversity controlling arrangement for diversity controlling the antenna switching arrangement on the basis of at least one measured reception parameter. Such a wireless digital communication system can be any system in which antenna diversity switching is applied for combatting fading inter alia, such as with indoor transmission of high frequency signals whereby radio signals are reflected by objects, or any other indoor or outdoor multi-path transmission environment. The signals transmitted in the communication system can be data signals, digital audio signals or digital video signals.

The present invention further relates to a radio apparatus for use in such a system, and to a digital speaker, and a digital speaker controlling apparatus.

2. Discussion of the Related Art

A wireless digital communication system of the above kind is known from the European Patent Application EP 0 454 585. Herein, a TDM (Time Division Multiplex) digital communication system is described in which antenna selection diversity is applied for overcoming fading with radio communication. In the known TDM system signals from a plurality of antennas are fed to a single receiver front-end and a diversity switch switches the antenna with the best received signal to the receiver front-end on the basis of signal-to-noise measurements. In the known TDM system, such measurements are carried out just before reception in a time slot assigned to the radio apparatus, and both the signal levels and the slopes of the signal levels are determined so as to predict the received signals at the antennas during the assigned time slot and to switch the antenna with the best predicted signal to the receiver front-end. In the known digital communication system, which is a mobile telephony system, for instance, no antenna diversity measurements are carried out during the reception of digital signals in the assigned time slot. In fact, there is no need for doing so because enough time is available for such measurement outside the assigned time slot. Thus, when a strong fading condition occurs on the current antenna during reception of digital signals in the assigned time slot and there would be a better antenna, such a condition is not notified. On the other hand, with a single receiver front-end, peeking to a signal at other antennas than at the current receiving antenna when receiving data in the assigned time slot, would incur the risk of losing data. This is due to the fact that searching is not free of cost. A worse antenna could have been selected while still data are lost during switching to other antennas and switching back to the current antenna. In case of receiving high quality digital audio signals, such as CD-signals (Compact Disk), or the like, loss of data would result in audible clicks and interrupts in the received and decoded signal as supplied to a listener.

SUMMARY OF THE INVENTION

It is an object of the present invention to provide a wireless digital communication system of the above kind, in which antenna diversity measurements and switching can be carried out during reception of useful data, whereby substantially no loss of data occurs.

To this end the wireless communication system according to the present invention is characterised in that the radio apparatus comprises an error correction decoder which is coupled to the receiver front-end, and that the diversity controlling arrangement is arranged for carrying out a search for a better antenna or antenna combination substantially within an error correction capability of the error correction decoder. The present invention is based upon the insight that the error correction decoder has the capability that it can correct data over a predetermined time period that no data are received. According to the present invention, this time period is used for peeking to signals on antennas other than the current receiving antenna. Preferably, the digital signals are received as a continuous stream of data. Such a condition occurs if the system is a dedicated system for communicating high quality high rate audio or video data, or the like, in a wireless LAN (Local Area Network), or in a wireless digital speaker system. In such systems, the advantages of the present invention are most striking, i.e. substantially without loss of data, optimal reception conditions are guaranteed during reception of useful signals. In case of digital video signals, these signals may be compressed, using a compression algorithm like MPEG-1 (Moving Picture Expert Group).

In an embodiment of a wireless communication system according to the present invention, a searching frequency of the search is adaptive to an overall reception condition of signals received by the antennas. Herewith, the system can be made less prone to searching disturbances caused by antenna switching.

In a further embodiment of a wireless communication system according to the present invention, the searching frequency is decreased when continuously no better antenna or antenna combination is found. Herewith, overall system improvement is achieved. This is based upon the insight that it does not make sense trying to search for a better antenna, when receiving a poor signal at the current antenna while at the same time such a poor signal is an overall best signal. By then decreasing the searching frequency, the system is disturbed by searching disturbances to a less extent. The searching frequency can be decreased exponentially.

In a further embodiment of a wireless digital communication system according to the present invention, the searching frequency is set to a predetermined maximum frequency when the overall reception condition is representative for a completely lost signal. Herewith, a better antenna or antenna combination is found quicker when in a poor signal reception condition while at the same time the searching frequency had been decreased. This is based upon the insight that it does not matter that searching disturbance would degrade system performance once the signal is completely lost.

Further embodiments are claimed in the dependent claims. It is advantageous to apply a combined detection criterion, depending on the reception conditions at the current antenna. When receiving a strong signal, field strength measurements are preferred because of such measurements allow for a fast decision on antenna performance. With poorer signal conditions, a determined bit-error-rate as determined from an output signal of the decoder is applied as an antenna signal quality measure, although bit-error-rate determination is an inherently slow mechanism. Thresholds for switching over to field strength measurement or to bit-error-rate determination are chosen appropriately. Herewith, an optimum quality determination strategy can be chosen.

A preferred application of the wireless communication system according to the present invention is that the system is a digital speaker system in which a central digital speaker controlling apparatus transmits high quality high data rate digital audio signals to at least one digital speaker comprising a radio apparatus according to the present invention and an amplifier coupled to the radio apparatus. Herewith, a fully wireless audio system is achieved in which the digital speakers can be put into different rooms within a building without the need of cumbersome and costly cabling. The digital radio apparatus and the antennas may be built-in in the digital speaker, or may be a separate unit connected to the digital speaker by wire. The radio transmitter may be built-in in the digital speaker controlling arrangement, or may be a separate unit. An application having similar advantages is a wireless LAN over which data are transmitted at high speed. In such an high data rate application, a transmission scheme like TDMA (Time Division Multiple Access) cannot be applied, i.e. data are transmitted as a continuous stream of data.

BRIEF DESCRIPTION OF THE DRAWINGS

The present invention will now be described, by way of example, with reference to the accompanying drawings, wherein FIG. 1 schematically shows a wireless digital communication system according to the present invention.

Throughout the figures the same reference numerals are used for the same features.

DETAILED DESCRIPTION OF THE PREFERRED EMBODIMENTS

Figure 1:
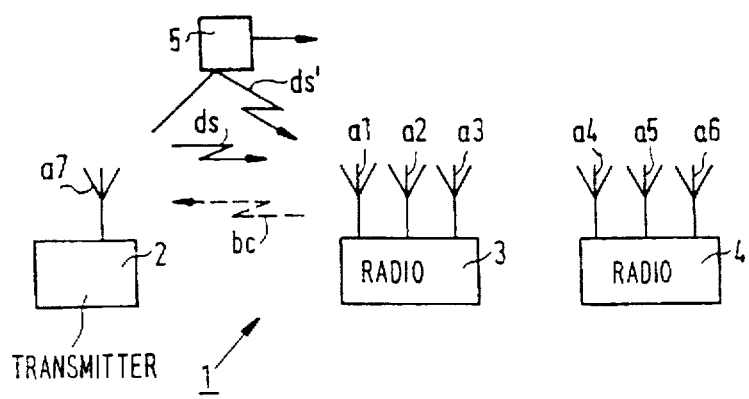

FIG. 1 schematically shows a wireless digital communication system 1 according to the present invention, comprising a transmitting apparatus 2 for transmitting a digital radio signal ds to radio apparatuses 3 and 4. The digital radio signal may be subject to fading conditions. Such fading conditions occur when the radio apparatuses 3 and 4 receive both the digital radio signal ds and a reflected digital radio signal ds' as reflected by a moving object 5, for instance. Such a situation readily occur indoors, for a slowly moving human being as the object 5. Each time the signals ds and ds' differ half the transmitted wavelength when arriving at the radio apparatus 3, the superposed received signal fades away because of signal cancellation. For a 900 MHz wavelength many cancellation positions per square-meter exist. Without any form of antenna diversity such a manyfold signal cancellation would cause very undesirable clicks and interrupts in an output signal in case the system is a high quality digital speaker system. When conveying data, undesirable loss of data might occur. According to the present invention a cheap and reliable antenna diversity is provided. To this end, the radio apparatuses 3 and 4 comprises a plurality of receiving antennas, a1, a2, and a3, and a4, a5, and a6, respectively which receive the digital radio signal ds as transmitted by a transmitting antenna a7. Such a system can be a digital speaker system, a wireless LAN (local area network), an indoor wireless computer network, a wireless digital headphone system, or the like, or any other digital communication system. According to the present invention, the digital radio signal ds is provided with redundant data so as to allow the radio apparatuses 3 and 4 to apply error correction after demodulation of the digital radio signal. The modulation technique applied can be any suitable one such as FSK (Frequency Shift Keying), MSK (Minimum Shift Keying), or the like. Preferably, the transmitted digital radio signal conveys high quality digital audio signals with CD-quality (Compact Disk), compressed video signals, notably signals for Multi-Media applications.

CD-quality signals typically have a 90 dB signal-to-noise ratio. Preferably, a freely available frequency band is applied such as the 900 MHz band in the USA (United States of America), or the 5.6 GHz band in Europe. A low data rate narrow bandwidth on a low frequency carrier can be applied for conveying backward control information bc. Also, a low data rate forward control channel can be applied. Then, the radio apparatuses 3 and 4 are provided with a low cost transmitter (to be described in the sequel) to the transmitting apparatus 2 which for this purpose comprises a receiver for receiving the backward control information bc. The transmitting apparatus 2 then is a digital speaker controlling apparatus.

Figure 2:
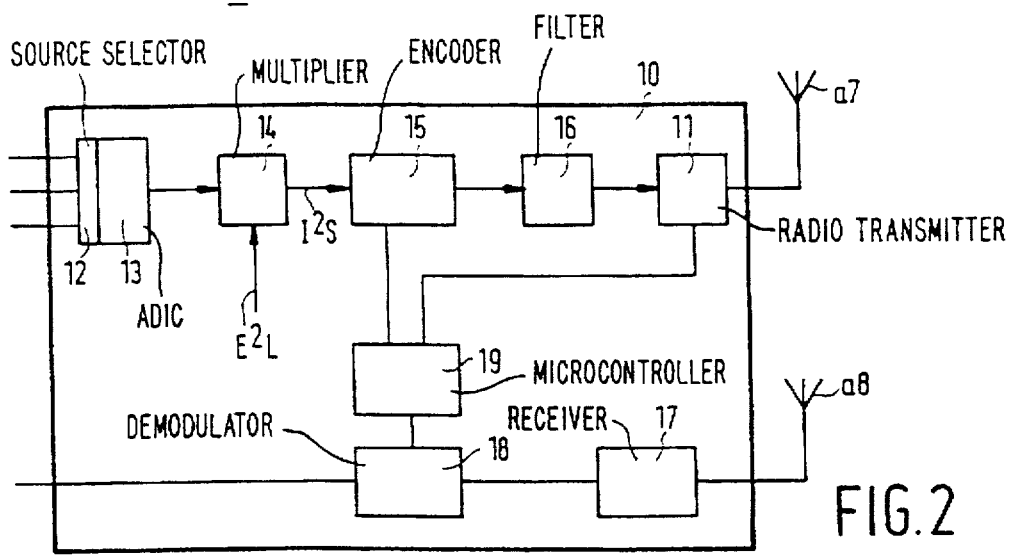
FIG. 2 shows an apparatus including a radio transmitter according to the present invention.

FIG. 2 shows an apparatus 10 according to the present invention including a radio transmitter 11. The apparatus 10 is a digital speaker controlling apparatus comprising a source selector 12 having three inputs, for CD (Compact Disk), for DCC (Digital Compact Cassette), and DSR (Digital Satellite Radio) digital information, respectively, which is coupled to an ADIC (Analog Digital Input Circuit) 13 which converts digital audio signals in accordance with the well-known IEC/EBU standards into an equivalent binary value of data and control bits. Such an ADIC 13 is an IC (Integrated Circuit) type SAA7274, which is readily available onto the market. An output signal of the ADIC 13 is a serial digital audio signal which conforms the so-called $I^2S$ format, a well-known serial bus. For control purposes at reception side, control information in $E^2L$ (Enhanced Easy Link) format can be added via a multiplier circuit 14 which is coupled at its output side to a well-known CIRC/EFM encoder (Cross Interleave Reed-Solomon Code/Eight-to-Fourteen) as described in the handbook "Principles of Optical Disc Systems", G. Bouwhuis et al, Adam Hilger Ltd, 1985, pp. 228–255. As is described on page 238 of said handbook, error correction bits are added in accordance with CIRC. With EFM the digital information is brought into channel code format as used on a Compact Disk. Such EFM modulated digital information is standardised for CD applications. According to the present invention, such CD-like information is transmitted to the radio apparatus by means of a radio link. The error correction capability of such CIRC/EFM digital signals is applied for achieving antenna diversity in a radio apparatus having a single receiver as will be described in the sequel. The present invention is based upon the insight that reception on a current antenna can be interrupted for a time period in the order of a few msec for peeking to other antennas so as to try to find a better reception antenna, within the error correction capability of a CIRC/EFM decoder. The principles of error correction are described in more detail on pp. 247–254 of said handbook, and in FIG. 7.19 on page 253 of said handbook, the performance of the CIRC code is described for several decoding strategies. The apparatus 10 further comprises a CIRC/EFM encoder 15 which is coupled at input side to the multiplier circuit 14 and at output side to the radio transmitter 11 via a lowpass filter 16. For receiving backward control information such as control information from a remote control unit (not shown) controlling digital speakers, the apparatus 10 comprises a receiver 17 and a demodulator 18. Such control information is received via an antenna a8 in a 40 MHz frequency band. The apparatus 10 further comprises a microcontroller 19 for controlling the encoder 15, the transmitter 11, and the demodulator 18.

Figure 3:
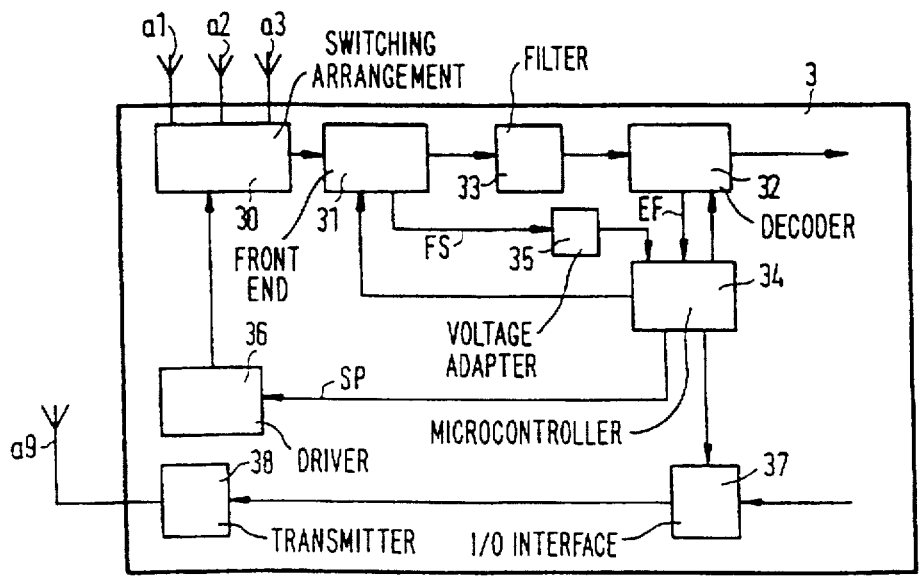
FIG. 3 shows a digital radio apparatus according to the present invention.

FIG. 3 shows the digital radio apparatus 3 according to the present invention, comprising an antenna switching arrangement 30 which is coupled to a single receiver front-end 31. According to the present invention, the radio apparatus 3 comprises a CIRC/EFM error correction decoder 32 which is coupled to the receiver front-end 31 via a lowpass filter 33. Such a error correction decoder 32 can be an IC-type SAA7345 which is described in the Philips Data Handbook "Semiconductors for Radio and Audio Systems", Book IC1a, pp. 405–435, May 1992. The radio apparatus 3 further comprises a programmed microcontroller 34 having RAM and ROM and I/O-interfaces as usual (not described in detail) so as to control the receiver front-end 31 and the error correction decoder 32. The receiver front-end 31 provides a field strength signal FS to the microcontroller 34 via a voltage adapter circuit 35. The adapter circuit 35 is used for "zooming" the field strength measurement voltage at an interesting voltage range so as to increase the dynamic range of the measurement, because neither too high nor too low a voltage value is of interest. The microcontroller 34 comprises an analog-to-digital converter (not shown) for digitizing the measured field strength voltage. The microcontroller 34 further controls a driver circuit 36 driving the antenna switching arrangement 30. For supplying backward control information to the apparatus 10, the radio apparatus 3 comprises a digital speaker system I/0-interface 37 which is coupled to the microcontroller 34 and to a remote control transmitter 38 which transmits such backward control information to the apparatus 10 via a transmitting antenna a9.

Figure 4:
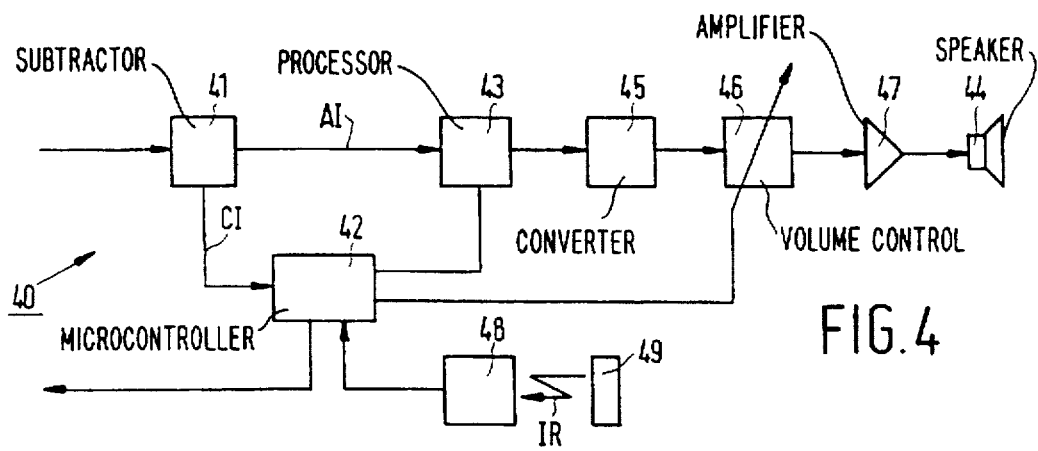
FIG. 4 shows a digital speaker according to the present invention.

FIG. 4 shows a digital speaker 40 which comprises the radio apparatus 3 according to the present invention. The speaker 40 further comprises a subtractor circuit 41 which subtracts control information CI from the decoded and error corrected received data stream. The control information is supplied to a microcontroller 42 comprised in the digital speaker 40. Audio information AI is supplied by the subtracter 41 to a digital sound processor 43 to which the audio information AI is fed. The digital sound processor 43 provides an audio signal to a speaker 44 via a series arrangement of a digital-to-analog converter 45, a volume control arrangement 46, and a power amplifier 47. For providing backward information to the apparatus 10, the digital speaker 40 comprises an infra-red receiving arrangement or so-called IR-eye 48 which receives infra-red signals from an infrared transmitting arrangement comprised in a remote control unit 49.

Figure 5:
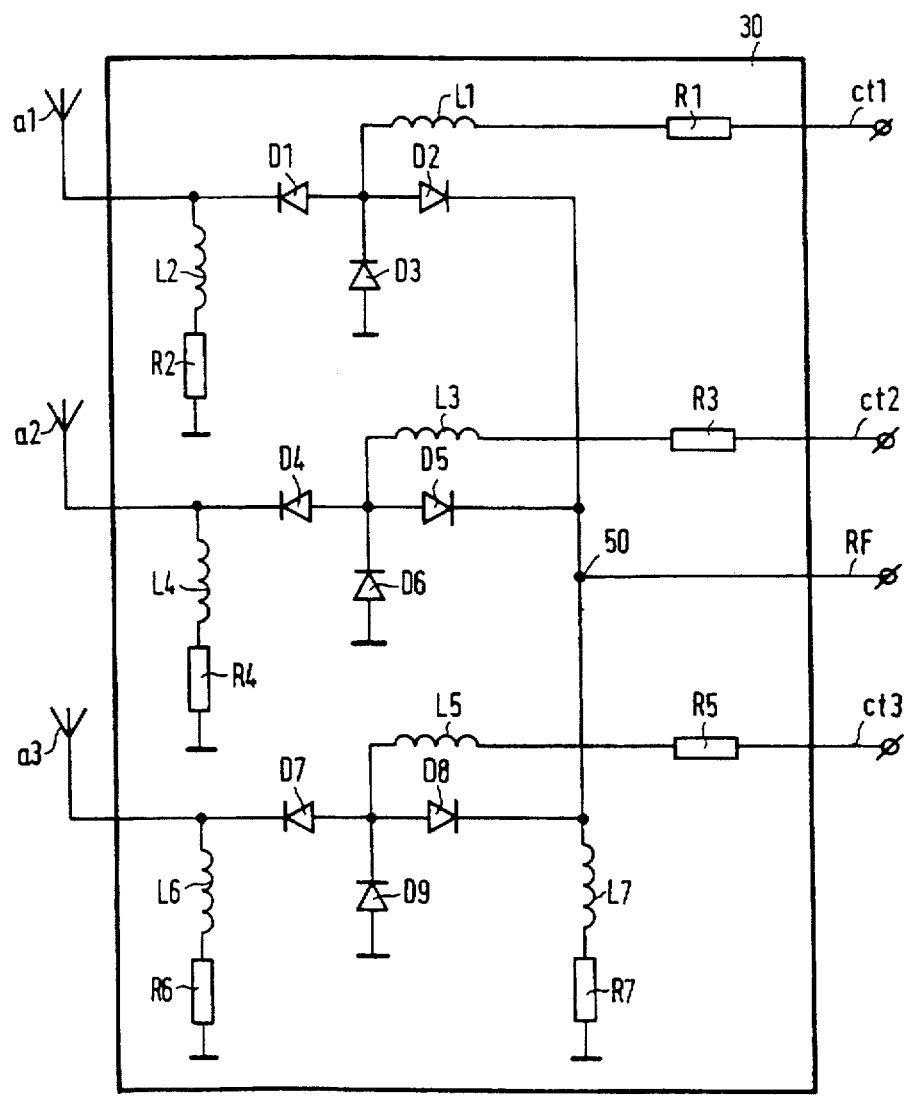
FIG. 5 shows an antenna switching arrangement according to the present invention.

FIG. 5 shows the antenna switching arrangement 30 according to the present invention to which switching control signals ct1, ct2, and ct3 can be supplied. The antenna switching arrangement provides an RF-signal RF to the single receiver front-end 31, the RF-signal RF being a signal received by one of the antennas a1, a2, and a3, or being a combined signal from the antennas a1, a2, and a3. Each antenna can be switched by a diode switch. The diode switches comprise diodes D1, D2, and D3, diodes D4, D5, and D6, and diodes D7, D8, and D9, respectively, and further inductors L1 and L2, L3 and L4, and L5 and L6, and resistors R1 and R2, R3 and R4, and R5 and R6, respectively. A common output terminal 50 is connected to ground via an LR-series-arrangement formed by an inductor L7 and a resistor R7.

Figure 6:
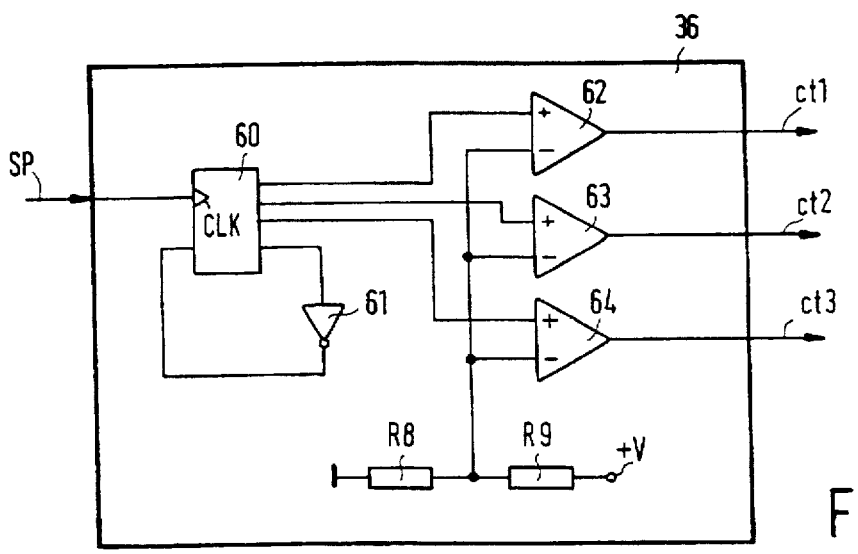
FIG. 6 shows a driver circuit for an antenna switching arrangement according to the present invention.

FIG. 6 shows the driver circuit 36 for the antenna switching arrangement 30 according to the present invention, to which a switching pulse SP is fed. The switching pulse SP is supplied to a clock input CLK of a presettable counter circuit 60. Such a counter can be an IC-type 74HC163 which is readily available. A ripple carry output signal of the counter circuit 60 is fed back to a count enable-P input of the counter circuit 60 via a inverter-gate 61, so as to re-load the counter with a value "001" for avoiding the counter to output a value "000" which would indicate all three antennas to be is a disconnected state. The counter circuit 60 is a 4-bit binary counter with synchronous reset of which three outputs are fed to positive input terminals of respective differential amplifiers 62, 63, and 64 so as to get the control signals ct1, ct2, and ct3, respectively. Negative input terminals of the differential amplifiers 62, 63, and 64 are coupled to a tap of a common voltage divider formed by resistors R8 and R9, which are coupled to ground and to a +V voltage supply respectively.

Figure 7:
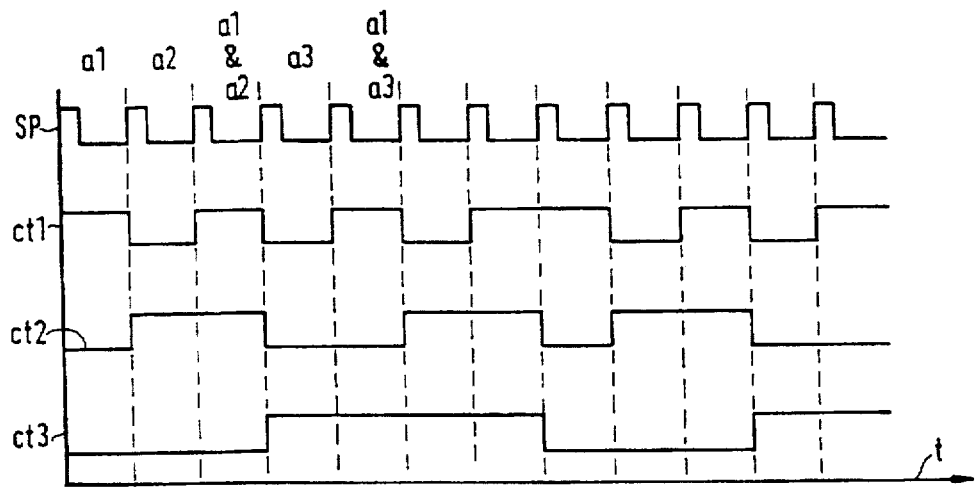
FIG. 7 shows a timing diagram illustrating operation of the antenna switching arrangement according to the present invention.

FIG. 7 shows a timing diagram illustrating operation of the antenna switching arrangement 30 according to the present invention. With the counter based driver circuit 36 the switch of the antennas a1, a2, and a3 is such that seven virtual antenna positions are selected in a cyclic way when the pulse SP is present, i.e. when the microcontroller 34 initiates peeking to a better antenna. Some selected antenna combinations are indicated above the switching pulses SP. Further combinations follow from the operation of the binary counter 60.

Figure 8:
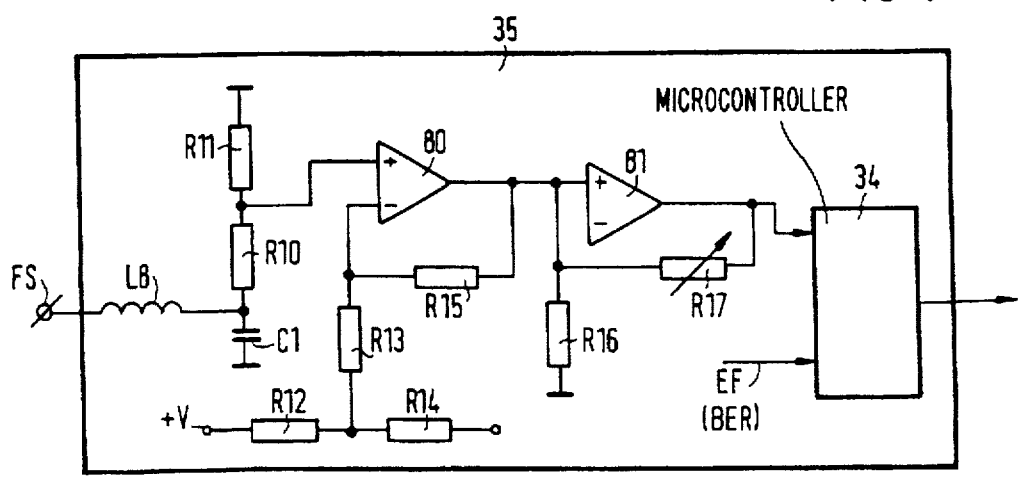
FIG. 8 shows a field strength voltage adaptor circuit according to the present invention.

FIG. 8 shows the field strength voltage adaptor circuit 35 according to the present invention. The adapter circuit 35 comprises a two-stage differential amplifier circuit formed by differential amplifiers 80 and 81. The measured field strength FS is fed to a positive input terminal of the differential amplifier 80 via a coupling network formed by an inductor L8, a capacitor C1, and resistors R10 and R11. Furthermore, adjustment resistors R12, R13, R14, R15, R16, and R17 are shown. The differential amplifier 81 is coupled at its output side to the programmed microcontroller 34. An error flag EF from the error correction decoder 32 is supplied to the microcontroller 34. The toggling frequency of the error flag EF is a measure for the bit error rate BER in the decoded signal. The microcontroller 34 determines the toggling frequency of the error flag as a measure for the bit error rate BER. On page 417 of said Data Handbook in which the decoder of IC-type SAA7345 is described in detail, the error correction capability of the decoder is described. A so-called CFLG pin of the IC SAA7345 quickly provides very detailed error messages. The microcontroller 34 will read the error messages when the error flag is detected. Peeking to other antennas interrupting signal decoding should substantially be kept within the error correction capability of the decoder because otherwise data would be lost. The algorithm for antenna switching, applying both the error flag EF or bit error rate BER, will be described in the sequel.

Figure 9:
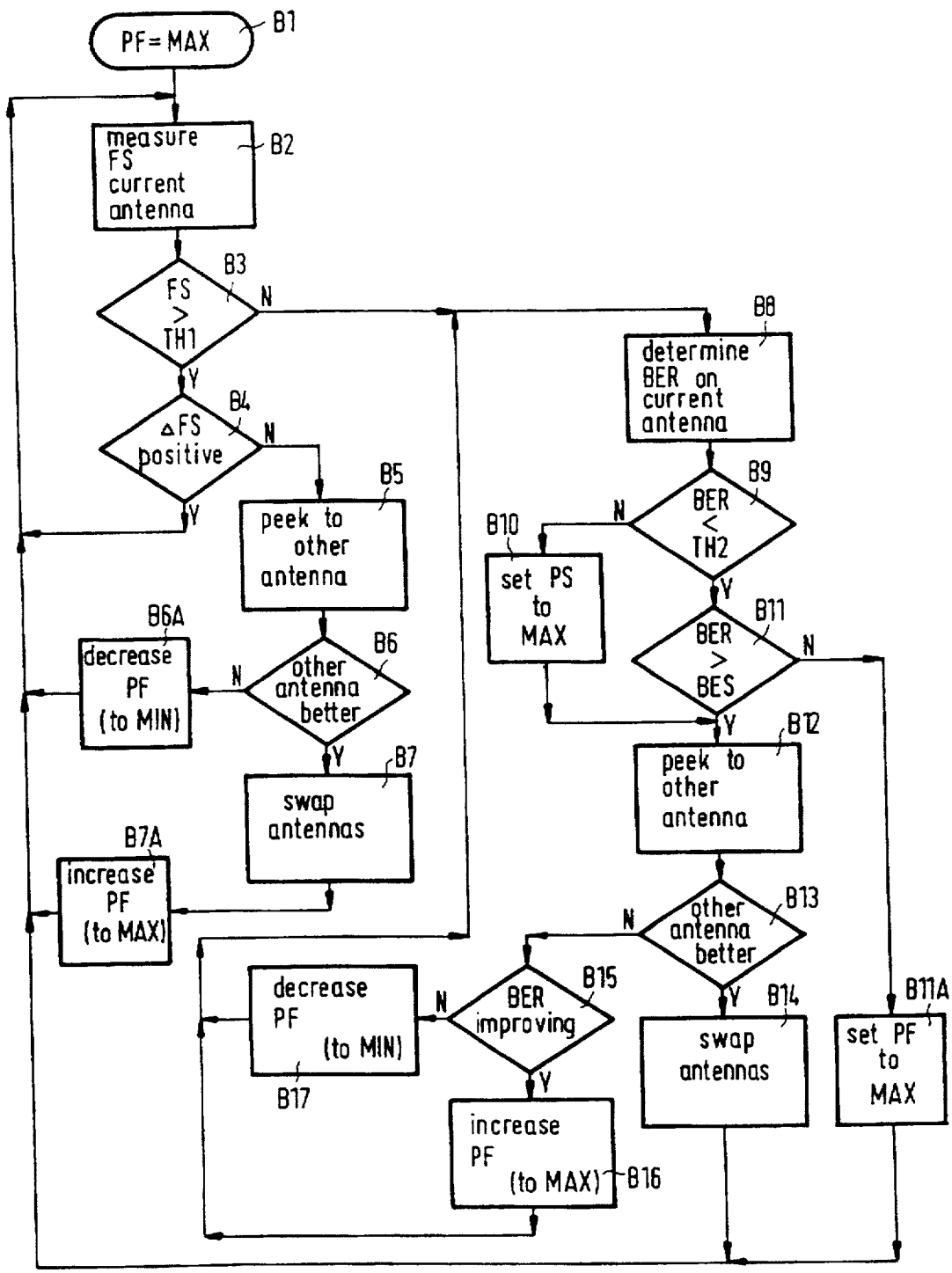
FIG. 9 shows a flow-chart for illustrating antenna diversity switching according to the present invention.

FIG. 9 shows a flow-chart for illustrating antenna diversity switching according to the present invention. In the flow-chart Y indicates "Yes" and N indicates "No" as a result of a test in a testing block. For simplicity it is assumed that only two antennas are used for antenna diversity and that these antennas can be swapped so as to achieve the best reception condition. At block B1 a good initial reception condition is assumed in which antenna swapping is based on field strength measurement only and in which a peeking frequency PF is set to a maximum MAX. The algorithm is adaptive in that the peeking frequency PF is gradually decreased to a minimum MIN when reception is relatively bad. When reception conditions improve, the peeking frequency is gradually increased to the maximum MAX. Preferably, decreasing or increasing of the peeking frequency is done exponentially. This is based on the insight that when receiving at a relatively poor antenna which is still the best one it does not make sense to peek at the other antennas with a very high peeking frequency because this could make overall reception even worse. When the radio apparatus 3 is in a relatively poor overall reception condition, the error correction decoder 32 is already at its limits or beyond its limits of error correction capability. Starting from a maximum peeking interval of 10 msec, the peeking interval could be increased to a few hundred msec, from 10 msec to 20 msec, then from 20 msec to 40 msec, and so on. When the signal is completely lost, the peeking frequency is set to the maximum MAX because then it is of no interest that peeking disturbs signal decoding. In block B2 the field strength FS at the current antenna is measured. In block B3 the field strength is tested. If the field strength is above a given threshold value TH1, it is tested in block B4 if a field strength difference ΔFS of two consecutive measurements is positive. If yes, field strength measurement at the current antenna is repeated. If no, in block B5 the microcontroller 34 initiates peeking to the other antenna. In block B6 it is tested if this other antenna is better. If yes, in block B7 the antennas are swapped, i.e. the other antenna becomes the current antenna from which the signal is demodulated and decoded. If no, in block B6A, the peeking frequency PF is decreased to MIN. If in the block B3 the measured field strength FS is below the threshold value TH1, the microcontroller switches to bit error rate testing. In block B8 the bit error rate BER on the current antenna is determined. In block B9 it is tested if the bit error rate BER is above a given threshold value TH2. If no, the radio apparatus 3 is in a reception condition of a completely lost signal, and after having increased the peeking frequency PF to the maximum MAX in block B10, the microcontroller 34 peeks to another antenna in block B12. If yes, in block B11 it is tested if the determined bit error rate exceeds a given set bit error rate BES, e.g. BES=10$^{-4}$. If no, measurement/determination on the current antenna is repeated with the peeking frequency set to MAX in block B11A. If yes, in the block B12 the microcontroller 34 initiates peeking to the other antenna. Then, in block B13 it is tested if the other antenna is better. If yes, in block B14 the antennas are swapped. If no, in block B15 it is tested if in consecutive BER determinations the bit error rate is improving. If yes, in block B16, the peeking frequency PF is stepwise increased to the maximum MAX at most. If no, in block B17, the peeking frequency PF is stepwise decreased to a minimum value MIN at most. After increase or decrease of the peeking frequency PF, as the case may be, the microcontroller 34 repeats bit error determination on the current antenna. When more than two antennas are used, peeking means looking for a better antenna among these antennas, and swapping is replaced by selecting the best antenna or antenna combination among the antennas. The setting of the peeking frequency can be implemented implicitly in field strength or bit error measurements by determining a sliding average over 1/PF measurements, averaging taking place from the 1/(PF-1)-th previous measurement value to the current measurement value.

I claim:

1. A wireless digital communication system comprising a radio apparatus having at least two antennas and a single receiver front-end, the single receiver front-end being coupled to the antennas via an antenna selection switching arrangement, and having a diversity controlling arrangement for diversity controlling the antenna switching arrangement on the basis of at least one measured reception parameter, wherein said radio apparatus further comprises an error correction decoder coupled to the receiver front-end, and further wherein the diversity controlling arrangement is arranged for carrying out a search for a better antenna or antenna combination substantially within an error correction capability of the error correction decoder.

2. The wireless digital communication system according to claim 1, wherein a searching frequency (PF) of the search is adaptive to an overall reception condition of signals received by the antennas.

3. The wireless digital communication system according to claim 2, wherein the searching frequency (PF) is decreased when continuously no better antenna or antenna combination is found.

4. The wireless digital communication system according to claim 3, wherein the searching frequency (PF) is exponentially decreased.

5. The wireless digital communication system according to claim 4, wherein the searching frequency (PF) is set to a predetermined maximum frequency (MAX) when the overall reception condition is representative for a completely lost signal.

6. The wireless digital communication system according to claim 4, wherein the at least one measured reception parameter comprises a field strength (FS) of a received signal and a bit-error-rate (BER) determined from an output signal (EF) of the error correction decoder, the diversity controlling arrangement deciding on a quality of received signals on the basis of one parameter selected from the group consisting of the measured field strength (FS) and the determined bit-error-rate (BER).

7. The wireless digital communication system according to claim 3, wherein the searching frequency (PF) is set to a predetermined maximum frequency (MAX) when the overall reception condition is representative for a completely lost signal.

8. The wireless digital communication system according to claim 3, wherein the at least one measured reception parameter comprises a field strength (FS) of a received signal and a bit-error-rate (BER) determined from an output signal (EF) of the error correction decoder, the diversity controlling arrangement deciding on a quality of received signals on the basis of one parameter selected from the group consisting of the measured field strength (FS) and the determined bit-error-rate (BER).

9. The wireless digital communication system according to claim 2, wherein the searching frequency (PF) is set to a predetermined maximum frequency (MAX) when the overall reception condition is representative for a completely lost signal.

10. The wireless digital communication system according to claim 9, wherein the at least one measured reception parameter comprises a field strength (FS) of a received signal and a bit-error-rate (BER) determined from an output signal (EF) of the error correction decoder, the diversity controlling arrangement deciding on a quality of received signals on the basis of one parameter selected from the group consisting of the measured field strength (FS) and the determined bit-error-rate (BER).

11. The wireless digital communication system according to claim 2, wherein the at least one measured reception parameter comprises a field strength (FS) of a received signal and a bit-error-rate (BER) determined from an output signal (EF) of the error correction decoder, the diversity controlling arrangement deciding on a quality of received signals on the basis of one parameter selected from the group consisting of the measured field strength (FS) and the determined bit-error-rate (BER).

12. The wireless digital communication system (1) according to claim 1, wherein the at least one measured reception parameter comprises a field strength (FS) of a received signal and a bit-error-rate (BER) determined from an output signal (EF) of the error correction decoder, the diversity controlling arrangement deciding on a quality of received signals on the basis of one parameter selected from the group consisting of the measured field strength (FS) and the determined bit-error-rate (BER).

13. The wireless digital communication system according to claim 12, wherein a decision of the diversity controlling arrangement is based upon the measured field strength (FS) of a signal at a current antenna or antenna combination when the measured field strength (FS) of the signal is above a predetermined threshold (TH1), the diversity controlling arrangement further starting a peeking to another antenna when the measured field strength (FS) decreases with successive measurements.

14. The wireless digital communication system according to claim 12, wherein a decision of the diversity controlling arrangement is based upon the determined bit-error-rate (BER) corresponding to a signal received at the current antenna or antenna combination when a measured field strength of the signal is below a predetermined threshold (TH1), the diversity controlling arrangement starting a peeking to another antenna when the determined bit-error-rate (BER) increases with successively determined bit-error-rates.

15. The wireless digital communication system according to claim 14, wherein a searching frequency is set to a predetermined maximum frequency (MAX) when the determined bit-error-rate exceeds a predetermined maximum value (TH2).

16. A digital radio apparatus for use in a digital communication system, said digital radio apparatus comprising at least two antennas and a single receiver front-end, the single receiver front-end being coupled to the antennas via an antenna selection switching arrangement, and a diversity controlling arrangement for diversity controlling the antenna switching arrangement on the basis of at least one measured reception parameter, wherein said radio apparatus further comprises an error correction decoder coupled to the receiver front-end, and wherein the diversity controlling arrangement is arranged for carrying out a search for a better antenna or antenna combination substantially within an error correction capability of the error correction decoder.

17. A digital speaker comprising an audio amplifier and at least one speaker, said digital speaker further comprises a digital radio apparatus coupled to the audio amplifier, the digital radio apparatus having at least two antennas and a single receiver front-end, the single receiver front-end being coupled to the antennas, via an antenna selection switching arrangement and having a diversity controlling arrangement for diversity controlling the antenna switching arrangement on the basis of at least one measured reception parameter, the radio apparatus further comprising an error correction decoder coupled to the receiver front-end, and wherein the diversity controlling arrangement is arranged for carrying out a search for a better antenna or antenna combination substantially within an error correction capability of the error correction decoder .

* * * * *